United States Patent [19]

Kojima et al.

[11] 4,393,126
[45] Jul. 12, 1983

[54] METHOD FOR MANUFACTURING IN-LINE HOLOGRAM LENS

[75] Inventors: Chiaki Kojima, Yokohama; Kayoko Hasegawa, Kamakura; Kosuke Miyahara, Yokohama, all of Japan

[73] Assignee: Sony Corporation, Tokyo, Japan

[21] Appl. No.: 261,728

[22] Filed: May 7, 1981

[30] Foreign Application Priority Data

May 14, 1980 [JP] Japan ................... 55-63795

[51] Int. Cl.$^3$ .................... G03C 5/00; G02B 5/32
[52] U.S. Cl. .................... 430/2; 430/1; 430/321; 430/5; 430/945; 350/3.72; 350/3.73
[58] Field of Search .................... 430/1, 2, 321, 5, 945; 350/3.72, 3.73

[56] References Cited

U.S. PATENT DOCUMENTS

| | | | |
|---|---|---|---|
| 3,807,829 | 4/1974 | Close | 350/3.72 |
| 3,940,204 | 2/1976 | Withrington | 350/3.72 |
| 4,054,356 | 10/1977 | Noguchi | 350/3.72 |
| 4,245,882 | 1/1981 | Chang | 350/3.72 |
| 4,312,559 | 1/1982 | Kojima et al. | 350/3.72 |

FOREIGN PATENT DOCUMENTS

| | | | |
|---|---|---|---|
| 54-03561 | 1/1979 | Japan | 350/3.72 |
| 1435134 | 5/1976 | United Kingdom | 350/3.72 |

OTHER PUBLICATIONS

Richter, A. et al., *Applied Optics*, vol. 13, No. 12, 12/74, pp. 2924–2930.

*Primary Examiner*—Charles L. Bowers, Jr.
*Attorney, Agent, or Firm*—Lewis H. Eslinger; Alvin Sinderbrand

[57] ABSTRACT

A method of producing an inline hologram lens is disclosed which includes the steps of producing a diffracted wave beam by a diffraction device, producing a spherical wave beam by an optical device, providing the diffracted wave beam perpendicularly incident on a photo-sensitive layer as a reference wave beam, simultaneously providing a spherical wave beam perpendicularly incident on the photo-sensitive layer as a subject wave beam through the diffraction device, and developing the photo-sensitive layer to produce an inline hologram lens.

5 Claims, 14 Drawing Figures

METHOD FOR MANUFACTURING IN-LINE HOLOGRAM LENS

BACKGROUND OF THE INVENTION

1. Field of the Invention

The present invention relates generally to a method of producing a hologram lens and, more particularly, is directed to a method of producing an inline hologram lens.

2. Description of the Prior Art

In the prior art, there has been proposed no method which can easily produce an inline hologram lens with a large N.A. (numerical aperture).

OBJECTS AND SUMMARY OF THE INVENTION

Accordingly, an object of the present invention is to provide a novel method of producing an inline hologram lens that avoids the problems inherent in the prior art.

Another object of the invention is to provide a novel method of producing an inline hologram lens in a simple manner.

A further object of the invention is to provide a method of producing an inline hologram lens without using an off-axis hologram lens as a mother lens.

According to an aspect of the present invention, a method of producing an inline hologram lens is provided which comprises the steps of:

producing a diffracted wave beam by diffraction means;

producing a spherical wave beam by optical means;

providing said diffracted wave beam perpendicularly incident on a photo-sensitive layer as a reference wave beam;

simultaneously providing said spherical wave beam perpendicularly incident on said photo-sensitive layer as a subject wave beam through said diffraction means; and developing said photo-sensitive layer to produce said inline hologram lens.

The above, and other, objects, features and advantages of the present invention will become apparent from the following detailed description of illustrative embodiments which is to be taken in conjunction with the accompanying drawings.

DETAILED DESCRIPTION OF THE PREFERRED EMBODIMENTS

Before describing the present invention, a known inline hologram lens and off-axis hologram lens will first be described. The recording and reproducing theory of the two hologram lenses will be now briefly described.

Figure 1:
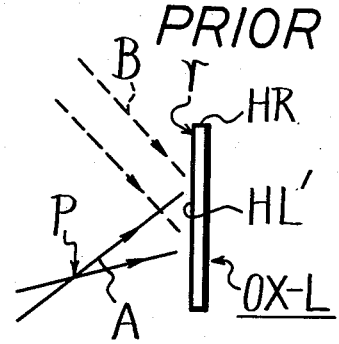
FIGS. 1 to 4 are respectively schematic diagrams used to explain the recording and reproduction methods of prior art hologram lenses.

First, an off-axis hologram lens will be described. As shown in FIG. 1, on a record surface (photo-sensitive surface) r of a hologram record medium HR, a record subject wave beam (spherical wave beam) A and a record reference wave beam (plane or spherical wave beam) B are each irradiated at an incident angle of about 45° with respect to the normal to surface r and at both sides of the normal, namely, at the off-axis, so that an off-axis hologram lens portion HL' of, for example, a disc-shape or ellipse-shape, which consists of a graphic interference image or pattern, is recorded. A description of the developing treatment of the recorded surface r will be omitted. In this case, record subject wave beam A is provided by using an optical lens and converges or focusses at a point P and diverges after point P. Further, both beams A and B are provided from a laser beam emitted from the same laser light source. Thus, an off-axis hologram lens OX-L is produced.

Figure 2:
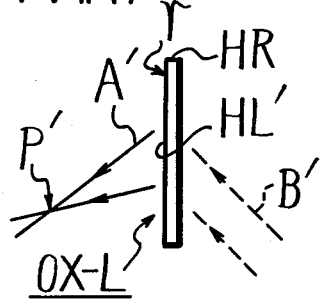

During reproduction with off-axis hologram lens OX-L, as shown in FIG. 2, a reproduction reference wave beam B' similar to beam B shown in FIG. 1 is irradiated on the off-axis hologram lens portion HL' from the side opposite to record surface r along the extending line of record reference wave beam B shown in FIG. 1. Then, a reproduction subject wave beam A' is reproduced from the side of record surface r, which beam A' is converted or focussed at a point P'. To the contrary, when reproduction reference wave beam B' is irradiated on record surface r of record medium HR in the same manner as record reference wave beam B in FIG. 1, but different to that of FIG. 2, a reproduction subject wave beam is reproduced from the surface of record medium HR opposite to record surface r and which diverges along the extending line of record subject wave beam A in FIG. 1.

Figure 3:
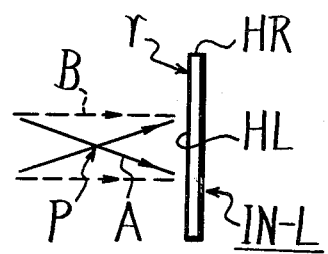

Now, an inline hologram lens will be described. As shown in FIG. 3, a record subject wave beam (spherical wave beam) A and record reference wave beam (plane or spherical beam) B are irradiated on record surface r of hologram record medium HR, which beams A and B have their optical axes coincident in the normal direction of surface r, that is, inline with each other, to form or record an inline hologram lens portion HL consisting of a graphic interference image or pattern. The remainder of the inline hologram lens is substantially the same as the lens shown in FIG. 1. Thus, an inline hologram lens IN-L is produced.

Figure 4:
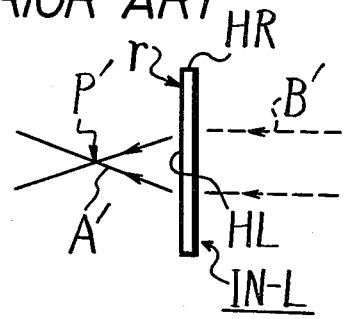

During reproduction with inline hologram lens IN-L, if, as shown in FIG. 4, a reproduction reference wave beam B' similar to the record reference wave beam B shown in FIG. 3 is irradiated on inline hologram lens portion HL from the side opposite to record surface r of record medium HR along the extending line of beam B, a reproduced subject wave beam A' is reproduced from record surface r which converges or focusses at a point P'. In this case, it is also possible that the reproduction reference wave beam is irradiated on record surface r of hologram record medium HR to reproduce a diverging subject wave beam. The remainder of the lens of FIG. 4 is substantially the same as the lens of FIG. 2.

The hologram lens thus produced is lightweight and has a small size. Further, by desirably selecting a mother lens, which provides a subject wave beam, a lens with a desired N.A. (numerical aperture) and operating distance can be made, and such lens can be mass-produced by duplication lenses having the same characteristic.

As a side note, an objective lens, which is used as, for example, an optical signal reproduction head in an optical signal reproduction apparatus, has a rather large N.A., and in the art, an optical lens, consisting of a number of lens sets similar to the objective lens of a microscope, is used widely. However, such an objective lens can not be made compact and lightweight, so that with a focussing servo system, since the objective lens is moved up and down, a rather large mechanical energy is required so that the servo device becomes large in size and complicated in construction.

Therefore, it is desired to use the above hologram lens as the objective lens of an optical signal reproduction head. However, an off-axis hologram lens is not desired as the objective lens of the optical signal reproduction head for the following reasons.

One of the reasons is a follows. Since the objective lens is moved up and down by the focussing servo system, as described above, it is necessary that the reproduction reference wave beam be simultaneously moved up and down in parallel therewith to be irradiated positively on the lens portion of the off-axis hologram lens. In the case of an inline hologram lens, if its optical axis is parallel to the normal to the inline hologram lens portion HL, since the moving direction of the lens is coincident with the direction of the reproduction reference wave beam, it is unnecessary to move the reproduction reference wave beam simultaneously therewith.

The other of the reasons is as follows. It is necessary that the off-axis hologram lens is rotated and adjusted for the reproduction reference wave beam about three axis perpendicular with one another with an accuracy of about ±0.5° to bring the focussing or converging point and the optical axis of the reproduction subject wave beam to a predetermined position. This adjustment, however, is very complicated and almost impossible when the N.A. of the lens is large. The inline hologram lens is substantially free of the above difficult adjustment.

From the above, it will be understood that the inline hologram lens is desired as the objective lens of an optical signal reproducing head.

Figure 5:
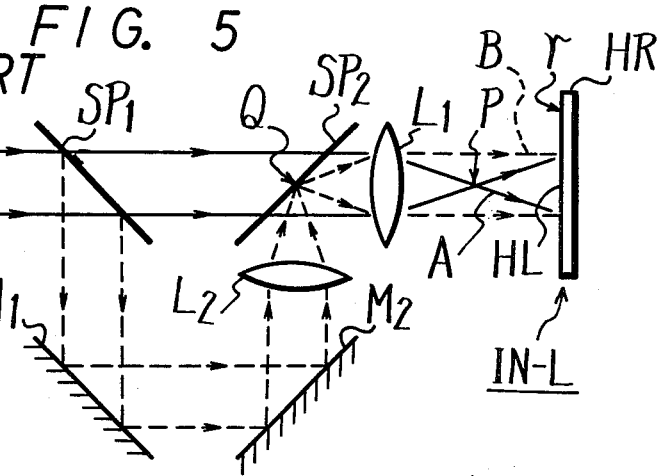
FIG. 5 is a schematic diagram used to explain a method of recording a prior art inline hologram lens.

Although the manner of recording the inline hologram lens is described briefly with reference to FIG. 3, it will be described in more detail with reference to FIG. 5. The record subject wave beam A and record reference wave beam B, which have their optical axes to the normal to record surface r of hologram record medium HR, are irradiated on a circular area of record surface (photo-sensitive surface) r of hologram record medium HR to form the inline hologram lens portion HL, which consists of graphic interference patterns. In this case, both beams A and B are provided by the same laser beam from a laser beam or light source LS.

The record subject wave beam A is prepared in the following manner. A part of the laser beam (plane wave beam) from laser light source LS is irradiated through two beam splitters $SP_1$ and $SP_2$ on a mother lens (optical convex lens) $L_1$ to provide a spherical wave beam which is focussed at a point P (which corresponds to the rear focal point of lens $L_1$) and then diverged therefrom. This spherical wave beam is used as the record subject wave beam A. The record reference wave beam B is prepared in the following manner. A part of the laser beam from laser light source LS is reflected by beam splitter $SP_1$, and further reflected by two mirrors $M_1$ and $M_2$ onto an auxiliary lens (optical convex lens) $L_2$. The beam passed through lens $L_2$ is focussed at a center point Q of beam splitter $SP_2$ (which point Q corresponds to the rear focal point of lens $L_2$), is then reflected by beam splitter $SP_2$ and is passed through mother lens $L_1$ as the record reference wave beam B (which is a parallel plane wave beam).

In this case, the N.A. of inline hologram lens IN-L thus produced depends upon the N.A of mother lens $L_1$, so that when this inline hologram lens IN-L is used as the objective lens of the above-mentioned optical signal reproducing head, it is necessary to select the N.A. of inline hologram lens IN-L to be rather large. Therefore, in this case, lenses with large N.A. must of course be used for lenses $L_1$ and $L_2$.

When an ordinary optical lens is used for each of lenses $L_1$ and $L_2$, a lens consisting a number of lens sets must be used, as with the objective lens of a microscope. As the N.A. becomes large, the focal points of lenses $L_1$ and $L_2$ are positioned within the mirror cylinder with the result that the method of recording the inline hologram lens shown in FIG. 5 becomes impossible from a practical viewpoint.

In order to avoid this problem, the following method of recording an inline hologram lens with large N.A. has been proposed. In particular, a beam splitter is provided in opposing relation to a hologram record medium, an optical lens consisting of a number of lens sets is located at the opposite side of the beam splitter as an objective lens, the laser beam from a laser light source is incident on the objective lens, the diverging beam emitted therefrom is irradiated on the hologram record medium through the beam splitter as a record subject wave beam, the laser beam is also incident on an auxiliary lens as a record reference wave beam, this record reference wave beam is reflected on the above beam splitter, and then the reflected beam is irradiated on the hologram record medium.

With the above recording method, since the record subject wave beam (spherical beam) from the objective lens passes through the beam splitter, it is subjected to aberration. To avoid this defect, it is necessary that a special objective lens is used to thereby correct the aberration of the record subject wave beam, or alternatively, a similar beam splitter is provided upon reproduction. This is, however, not preferred from a practical viewpoint.

In view of the above problems, the applicants of this application have proposed a method for easily manufacturing an inline hologram lens with a large N.A.

Now, an example of this method for manufacturing the above inline hologram lens will be described with reference to FIG. 6. In this example, an off-axis hologram lens OX-L, which is made by using a record subject wave beam and a record reference beam in off-axis with each other, is used as a mother lens (objective lens). The method of making the off-axis hologram lens OX-L, and particularly the method of recording therewith, will be described later with reference to FIG. 8. The off-axis hologram lens OX-L is formed of a hologram record medium $HR_2$, which consists of a glass substrate BS and a photo-sensitive layer (record layer) K coated on glass substrate BS. On the center portion of photo-sensitive layer K, a disc-shaped off-axis hologram lens portion HL' is recorded and which is then developed as will be described later. In this case, the off-axis hologram lens OX-L is formed so that when a reproduction reference wave beam (plane or spherical wave beam, in this example, the plane wave beam is used) B' is irradiated on the lens portion HL' of photo-sensitive layer K through glass substrate BS at an angle of about 45° with respect to the normal to lens portion HL', a reproduction subject wave beam A' is reproduced from photo-sensitive layer K which has its optical axis along the normal thereof and is focussed at a point P.

Figure 6:
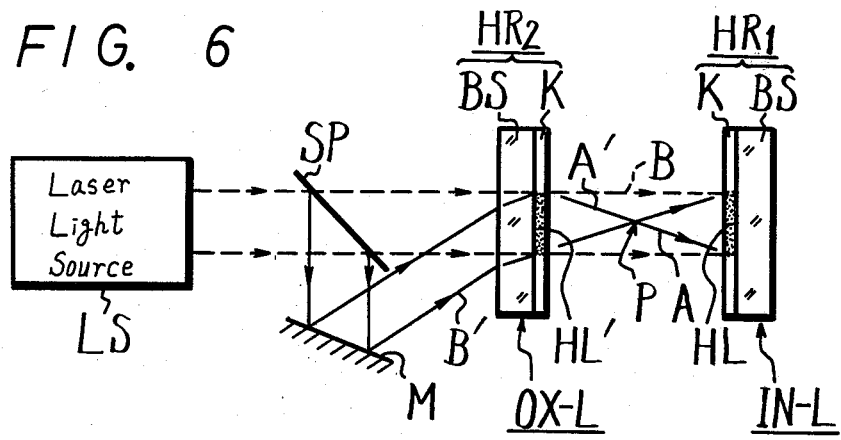
FIG. 6 is a schematic diagram of an example of a previously proposed method of making an inline hologram lens.

In FIG. 6, $HR_1$ designates a hologram record medium on which an inline hologram lens IN-L is to be formed, and is formed of a glass substrate BS and a photo-sensitive layer K coated thereon.

The off-axis hologram lens OX-L, serving as the mother lens, is in facing relation to hologram record medium $HR_1$. In this case, the off-axis hologram lens OX-L is located with respect to hologram record medium $HR_1$ so that photo-sensitive layer K of the former is in facing relation and parallel to photo-sensitive layer K of the latter with a predetermined distance therebetween.

The laser beam (parallel plane wave beam) from a laser light source LS is partially reflected on a beam splitter SP, further reflected on a mirror M, and the reflected beam (parallel plane wave beam) is irradiated on photo-sensitive layer K of off-axis hologram lens OX-L through glass substrate BS thereof as the reproduction reference wave beam B'. Then, this beam is reproduced from off-axis hologram lens OX-L as the reproduction subject wave beam A' which is focussed at point P and then diverges therefrom. This beam A' is incident on photo-sensitive layer K of hologram record medium $HR_1$ as the record subject wave beam A.

The laser beam from laser light source LS also partially passes through the beam splitter SP, through off-axis hologram lens OX-L and is incident on the photo-sensitive layer K of hologram record medium $HR_1$ as the record reference wave beam B, which is in inline relation to the record subject wave beam A (namely, the beams A and B have their optical axes coincident. Thus, a disc-shaped inline hologram lens portion HL is formed on the center portion of photo-sensitive layer K of record medium $HR_1$. This record medium $HR_1$ is then subjected to a developing process, which will be described later, to produce an inline hologram lens IN-L.

Another example of a method of recording will be described with reference to FIG. 7. In this example, the off-axis hologram lens OX-L serving as the mother lens is located with respect to the hologram record medium $HR_1$ so that glass substrate BS of the former is in contact with photo-sensitive layer K of the latter which is disposed in a similar arrangement to that shown in FIG. 6. Then, the recording of the inline hologram lens IN-L is carried out. In this case, the reproduction and record subject wave beams A' and A each become a spherical wave beam which diverges from an image point P.

Now, a description will be given of the manner of manufacture of the off-axis hologram lens OX-L, which is used as the mother lens, with reference to FIG. 8. A record subject wave (spherical wave) beam A is irradiated on photo-sensitive layer K of hologram record medium $HR_2$, which further includes glass substrate BS, in such a manner that the optical axis of beam A is coincident with the normal to photo-sensitive layer K, and a record reference wave (parallel plane wave) beam B is also irradiated on photo-sensitive layer K in such a manner that its optical axis intersects the normal at about 45°. Thus, a disc-shaped off-axis hologram lens portion HL' is recorded on the center portion of photo-sensitive layer K. Thereafter, photo-sensitive layer K is developed to provide the off-axis hologram lens OX-L. In this case, the record subject wave beam A is provided in the following manner. In particular, the laser beam (parallel plane wave beam) from a laser light source LS is partially passed through a beam splitter SP, is then incident on an auxiliary lens (optical lens) $L_2$, and is then focussed at a point Q (rear focal point of lens $L_2$). The spherical wave beam diverging from point Q is incident on a mother lens $L_1$ (objective lens and made of a number of optical lens sets) to focus the beam at a point P. The spherical wave beam diverging from point P is used as the record subject wave beam A.

The record reference wave beam B is provided in the following manner. In particular, the laser beam from laser light source LS is partially reflected by beam splitter SP, and then further reflected on a mirror M. The beam reflected by mirror M is used as the record reference wave beam B.

An objective lens of a microscope with an N.A. of, for example, 0.4 or 0.5 is employed as the mother lens $L_1$. The aperture of off-axis hologram lens portion HL' is selected, for example, 2 mm in diameter and the operation distance thereof is, for example, 2.3 mm. Accordingly, in this case, the aperture and operation distance of the inline hologram lens portion HL of inline hologram lens IN-L shown in FIG. 6 is determined by a predetermined distance between point P and inline hologram lens portion HL.

Figure 7:
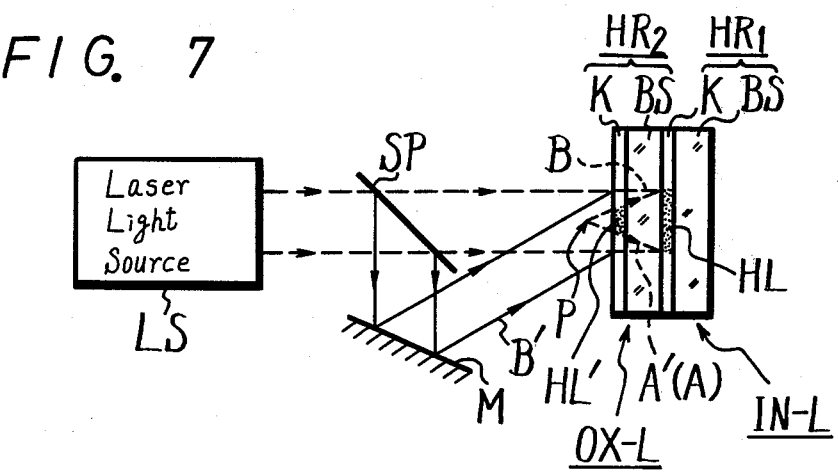
FIG. 7 is a schematic diagram of another example of a previously proposed method of producing an inline hologram lens.
Figure 8:
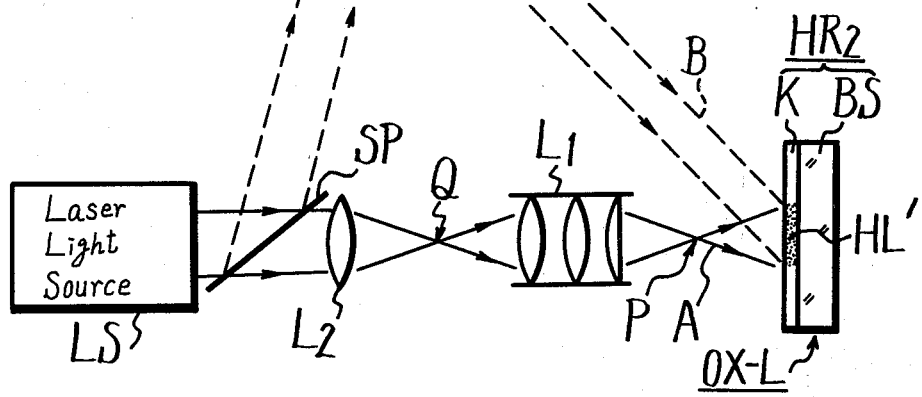
FIG. 8 is a schematic diagram used to explain an example of a method of making an off-axis hologram lens for use in the examples shown in FIGS. 6 and 7.

As the laser light sources LS used in the examples of FIGS. 6, 7 and 8, laser light sources may be used which produce the following laser beams, respectively.

Argon laser beam ($\lambda = 4880$ Å)
Krypton laser beam ($\lambda = 6471$ Å)
Coloring laser beam ($\lambda = 6330$ Å)
He-Ne laser beam ($\lambda = 6328$ Å)

The kind of photo-sensitive layers K of hologram record mediums $HR_1$ and $HR_2$ shown in FIGS. 6, 7 and 8 is selected in accordance with the laser beams.

Next, an example of making hologram record mediums $HR_1$, $HR_2$ and hologram lenses IN-L, OX-L will be now described. In particular, a suitable amount of layer hardening agent such as an aqueous solution of gelatin added with formaldehyde or glyoxal is kept at about 40° C., while a glass substrate with a thickness 1 mm and a spinner are kept also at about 40° C. Then, the aqueous solution of gelatin is coated on the glass substrate by the spinner. In this case, the coating thickness of gelatin solution on the glass substrate is selected such that the thickness of the dried coating is 5 $\mu$m in the hologram record medium for the off-axis hologram lens and 15 $\mu$m for that of the inline hologram lens. The gelatin aqueous solution coated on the glass substrate is dried as a gelatin layer which is a mother material of the photo-sensitive layer.

Next, the process for imparting photo-sensitivity to the gelatin layer will be described.

The photo-sensitivity to a blue or green color beam is given to the gelatin layer in the following manner. In particular, the gelatin layer is immersed in a 2 to 10 weight percent aqueous solution of ammonium bichromate for about 10 minutes, then taken out gradually therefrom, held vertically and then dried in a darkroom.

The photo-sensitivity to a red color beam is given to the gelatin layer as follows: an aqueous solution of 2 weight % ammonium bichromate and $1 \times 10^{-3}$ mol/l methylene blue coloring agent is added with ammonium to have about 10 pH, then the gelatin layer is immersed in this aqueous solution for about 10 minutes and then dried in a flowing atmosphere including ammonia and dried nitrogen.

In the above manner, the hologram record medium consisting of the glass substrate and photo-sensitive layer K coated thereon is manufactured.

The exposure to photo-sensitive layer K of the hologram record medium is carried out as described in connection with FIGS. 6, 7 and 8. In this case, the irradiation energy density of the laser beam is selected to be about 100 to 1000 mJ/cm$^2$.

The hologram record medium, whose photo-sensitive layer is exposed, is immersed in water. When the photo-sensitive layer has the photo-sensitivity to the blue or green color beam, it is immersed in flowing water at about 20° C. for about one hour. On the other hand, when the photo-sensitive layer has the photo-sensitivity to the red color beam, it is immersed in water at about 40° C. for about 30 minutes. Thereafter, the hologram record medium is immersed in an aqueous solution of 50% isopropanol for about 10 minutes, then dipped in an aqueous solution of 90% isopropanol for several seconds, then immersed in 100% isopropanol for about 10 minutes, and then rapidly dried by a hot wind. Thus, the developing treatment is finished.

Figure 9:
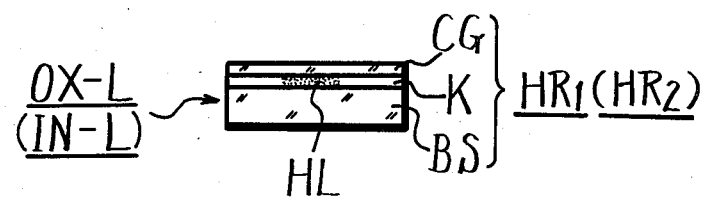
FIG. 9 is a cross-sectional view of a hologram lens made by using the recording method shown in FIGS. 6, 7 or 8.

The photo-sensitive layer, whose mother material is a gelatin layer, has a moisture absorption property, so that if it is left as it is, a problem of the hologram lens disappearing may result. To avoid this problem, as shown in FIG. 9, a glass cover CG with a thickness of about 150 µm is bonded to photo-sensitive layer K by means of a resin which is hardened by ultraviolet rays. In this manner, hologram lenses OX-L and IN-L are produced, respectively. In the drawings other than FIG. 9, the glass cover CG is omitted merely for brevity of description.

Now, the manner of duplicating a slave inline hologram lens IN-L' by using the inline hologram lens IN-L thus produced as the mother lens will be described.

Figure 10:
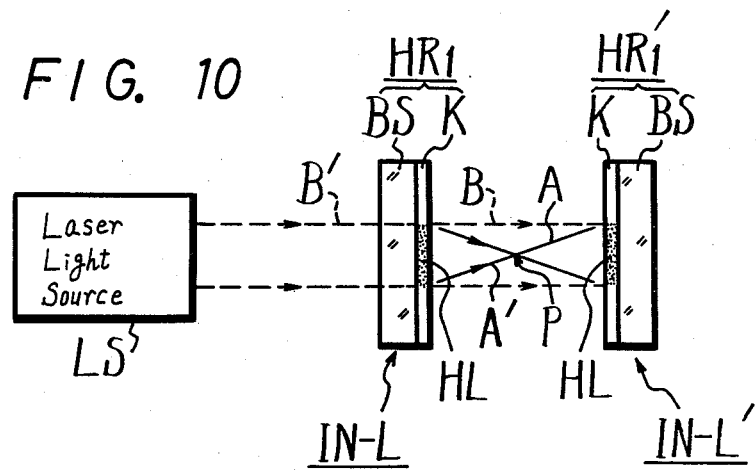
FIGS. 10 and 11 are respectively schematic diagrams showing examples of the duplication recording methods of an inline hologram lens.

As shown in FIG. 10, hologram record mediums HR$_1$ and HR$_1$' are disposed so that photo-sensitive layer K of the latter, which is to be a slave inline hologram lens IN-L' is in facing relation to photo-sensitive layer K of the former, which has a 50% diffraction efficiency, with a predetermined distance therebetween. Then, the laser beam from a laser light source LS is irradiated on glass substrate BS of hologram record medium HR$_1$. In this case, a part of the beam (50%) is used as a reproduction reference wave beam B' and the remaining beam (50%) is used as a record reference wave beam B for hologram record medium HR$_1$'. Thus, from the mother inline hologram lens IN-L, a reproduction subject wave beam A' is reproduced which is focussed at a point P and which is, in turn, irradiated on hologram record medium HR$_1$' as a record subject wave beam A to record or form a hologram lens portion HL on photo-sensitive layer K thereof.

Figure 11:
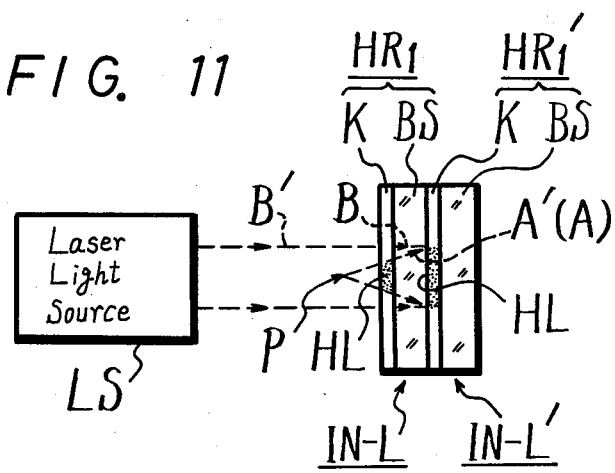

A slave inline hologram lens IN-L' can be also duplicated by the manner shown in FIG. 11. In this case, photo-sensitive layer K of hologram record medium HR$_1$' is in direct contact with glass substrate BS of mother inline hologram lens IN-L. In this case, reproduction and record subject wave beams A' and A are both spherical wave beams which diverge from an image point P.

According to the above described method of producing an inline hologram lens, a previously prepared off-axis hologram lens is used as the mother lens to make the inline hologram lens. Therefore, if such a mother lens is prepared, the inline hologram lens can be easily manufactured.

The above method, however, poses the problem that an extra process to make the off-axis hologram lens, which serves as the mother lens, is necessary.

Further, it is necessary that the off-axis hologram lens serving as the mother lens is rotated for the reproduction reference wave beam about three axes intersecting at right angles with each other with an accuracy of ±0.5° and adjusted so that the focussing point and optical axis of the reproduction subject wave beam is brought to a predetermined position. Such adjustment is very troublesome and very difficult especially when its N.A. is large. This is caused by the fact that the distribution of the graphic interference patterns of the off-axis hologram lens does not differ merely by point symmetry from that of the inline hologram lens, but the pitch of the graphic interference patterns is changed from large to small in the radial direction.

Further, owing to the above graphic interference pattern distribution of the off-axis hologram lens, when the thickness of the photo-sensitive layer increases during the moisture process after the exposure of the photo-sensitive layer whose mother material is gelatin, the cross-sectional dimension of the graphic interference pattern is varied, and hence, the characteristics of the lens become different. This phenomenon becomes large as the N.A. of the off-axis hologram lens becomes large, whereby the hologram lens can not practically be used.

An example of a method of producing an inline hologram lens according to the present invention, in which no off-axis hologram lens is used, will be hereinbelow described with reference to FIG. 12.

Figure 12:
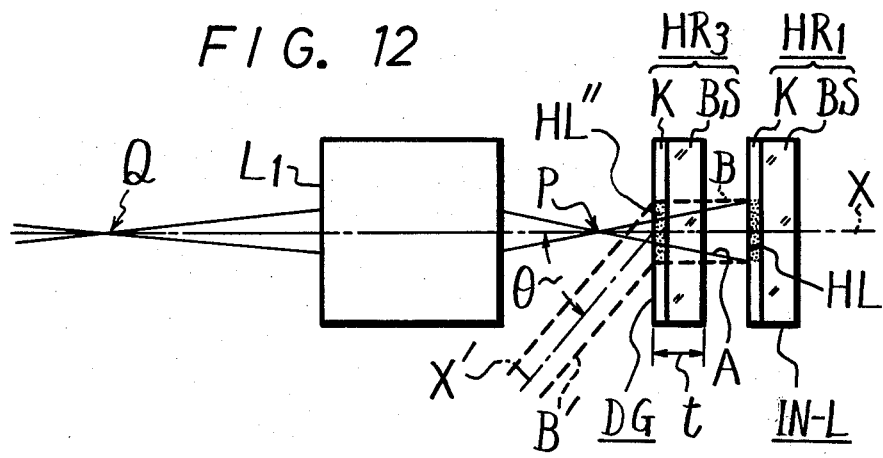
FIGS. 12 and 13 are respectively schematic diagrams showing examples of recording methods for making inline hologram lenses according to the present invention.

In FIG. 12, HR$_1$ designates a hologram record medium on which an inline hologram lens IN-L is recorded and which consists of a glass substrate BS and a photo-sensitive layer (record layer) K coated on glass substrate BS.

A first optical element (mother lens) L$_1$ is provided to radiate a spherical wave beam which is, for example, an objective lens of a microscope with a large N.A. of 0.4 or 0.5.

A second optical element DG is provided to radiate the diffracted wave beam. In general, a diffraction grating may be used as second optical element DG, but in this example, a plane wave hologram lens is employed as second optical element DG. This plane wave hologram lens DG is made of a hologram record medium HR$_3$ consisting of a glass substrate BS and a photo-sensitive layer (record layer) K coated thereon in which an off-axis plane wave hologram portion HL" of a disc-shape is recorded on the center of photo-sensitive layer K and thereafter is subjected to a developing process similar to that set forth above. In this case, the record subject wave beam and the record reference wave beam are both plane wave beams. The optical axis of the record subject beam is selected to be coincident with the normal to photo-sensitive layer K and at an angle $\theta$ to the optical axis of the record reference wave beam, as will be described later.

The mother lens $L_1$ is located in opposing relation to hologram record medium $HR_1$, and the plane wave hologram lens DG is located therebetween. In this case, hologram record medium $HR_1$ and plane wave hologram lens DG ae located so that their photo-sensitive layers K are both at the side of mother lens $L_1$ and are also in parallel with each other.

The laser beam (parallel plane wave beam) from a common laser light source (for example, argon, krypton, coloring, He—Ne laser light sources, which are not shown) is converged at a point Q by a lens (not shown) to produce a diverging spherical wave beam from point Q, which is then incident on mother lens $L_1$ to be converged at a point P from which a spherical wave beam with no spherical aberration is diverged. This diverging spherical wave beam is irradiated as the record subject wave beam A on photo-sensitive layer K of hologram record medium $HR_1$ through plane wave hologram lens DG under the condition whereby the optical axis X of the diverging spherical wave beam is coincident with the respective normals to photo-sensitive layers K of plane wave hologram lens DG and hologram record medium $HR_1$.

Further, the laser beam (parallel plane wave beam) from the common laser light source has its direction changed by a beam splitter, mirror or the like (not shown) and then irradiated as the reproduction reference wave beam B' on hologram portion HL″ of photo-sensitive layer K of plane wave hologram lens DG under the condition whereby the optical axis X' of the plane wave beam changed in its direction intersects optical axis X at an angle $\theta$ (which is an angle such that mother lens $L_1$ does not become an obstacle to the plane wave beam and may be, for example, 70°). The reproduced subject wave beam (plane wave beam) from plane wave hologram lens DG is irradiated on photo-sensitive layer K of hologram record medium $HR_1$ as the record reference wave beam B. This record reference wave beam B corresponds to the reproduction reference wave beam B' whose optical path direction is changed. The record subject wave beam A and the record reference wave beam B are in an inline relation, that is, their optical axes X are each coincident with the normal to photo-sensitive layer K of hologram record medium $HR_1$ and are also coincident with each other, as shown in FIG. 12, or otherwise parallel to each other.

In this manner, an inline hologram lens portion HL of a disc-shape is formed on the center of photo-sensitive layer K of hologram record medium $HR_1$, which is then subjected to a developing process similar to that described previously to produce an inline hologram lens IN-L.

Another example of the invention will be now described with reference to FIG. 13. In this example, as the second optical element DG, an off-axis hologram lens with a small N.A. is used. In this case, the plane wave beam from the common laser light source (for example, a semiconductor laser light source) is irradiated as the reproduction reference wave B' on a hologram lens portion HL″ of photo-sensitive layer K (which is coated on a glass substrate BS) of an off-axis hologram lens DG. The reproduction subject wave beam (which is a spherical wave beam which approximates a plane wave beam and which converges after hologram record medium $HR_1$) from off-axis lens DG is irradiated as the record reference wave beam B on photo-sensitive layer K of hologram record medium $HR_1$. The other parts of the process are substantially similar to those of the method described in connection with FIG. 12. In this manner, an inline hologram lens IN-L is made.

Now, an optical information (signal) reproduction apparatus, which uses the inline hologram lens produced by the method of the invention shown in FIG. 12 or 13 and which reproduces a recorded information (signal) from an optical record medium (disc), will be described with reference to FIG. 14, and also the relation between the optical record medium and the inline hologram lens will be described. In FIG. 14, RD designates an optical record medium which consists of a transparent substrate DB (made of, for example, vinyl chloride), a reflection diaphragm or layer RL (made of, for example, an aluminum diaphragm) coated to cover all of the surface of pits and lands formed on the lower surface of the transparent substrate DB and a protective diaphragm or layer (for example, PVA) GL coated on the lower surface of the reflection diaphragm RL to cover the same.

Figure 13:
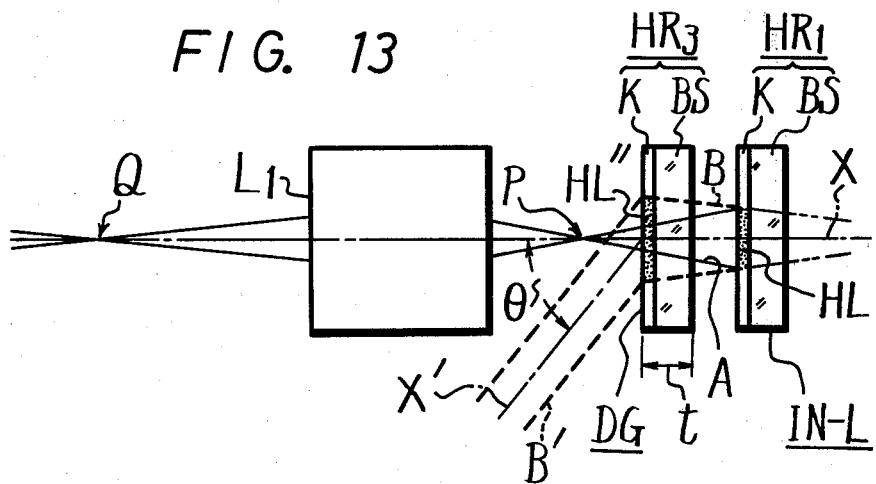
Figure 14:
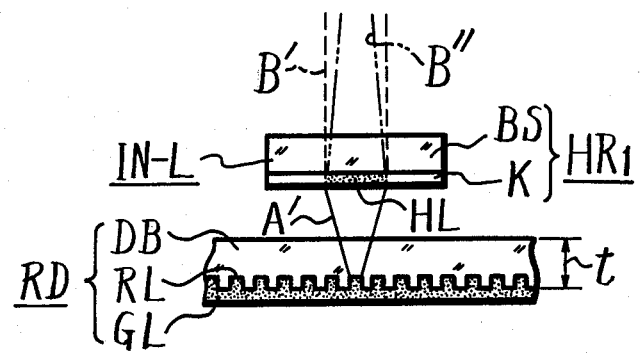
FIG. 14 is a schematic diagram showing an example of an optical information or signal reproduction apparatus.

The inline hologram lens IN-L (which serves as an objective lens forming a part of the reproduction means) made according to the method of the invention shown in FIG. 12 or 13 is so located that photo-sensitive layer K thereof is in facing relation and in parallel to substrate DB of record medium RD. Then, the reproduction reference wave beam (which is the plane wave B' in the case of the method shown in FIG. 12, while diverging spherical wave beam B″ in the case of the method shown in FIG. 13) is irradiated on inline hologram lens portion HL from the side of glass substrate BS of inline hologram lens IN-L, and the reproduction subject wave beam or converging or focussing spherical wave beam A', which is projected on the pits and lands of reflection diaphragm (layer) RL and which is obtained from inline hologram lens portion HL, is irradiated as the reproduction beam on reflection diaphragm (layer) RL through substrate DB of record medium RD. The beam reflected from reflection diaphragm (layer) RL travels back through the path of beams A' and B' (or B″) and impinges on a photo-electric conversion element (which is also sufficient when the laser light source is a semiconductor laser light source (not shown) and is reproduced as an electrical signal.

In the case where record medium RD is optically reproduced from the side of its transparent substrate DB, as shown in FIG. 14, if the reproduction subject wave beam A' is a spherical wave beam with no spherical aberration, this spherical wave beam is influenced by spherical aberration when it passes through transparent substrate DB which has a thickness t which is the optical path length. Thus, the reflected wave beam is produced with a spherical aberration.

Therefore, in the case of FIGS. 12 and 13, if a spherical wave beam with no spherical aberration is derived from mother lens $L_1$ and the thickness of second optical element DG, which is the optical path length, is selected approximately equal to t, the record subject wave beam A in FIGS. 12 and 13 is a spherical wave beam with a spherical aberration. Thus, the reproduction subject wave beam A' irradiated on record medium RD is a beam with a spherical aberration. Therefore, when this beam passes through transparent substrate DB, the reflected beam has no aberration, whereby the spherical aberration caused by transparent substrate DB of record medium RD can be corrected. Thus, a reflected wave beam with no spherical aberration can be obtained. In this case, the practical thickness t of second optical element DG and the thickness t of transparent substrate DB of record medium RD are both 1.1 mm and the reflective index thereof is about 1.5.

When the reproduction beam is irradiated on optical record medium RD from its front side, the reproduction beam is required to have substantially no aberration. In this case, it is sufficient that in consideration of the optical path length or thickness t of second optical element DG, a spherical wave beam with a spherical aberration can be radiated from mother lens $L_1$ and then passes through second optical element DG to correct the spherical aberration.

According to the method of the present invention described above, an inline hologram lens having good accuracy can be easily manufactured. In other words, it becomes unnecessary to prepare or use an off-axis hologram lens serving as a mother lens, so that the number of processes can be reduced. Further, by the same reason, an accurate mother lens such as an objective lens of a microscope can be used as the first optical element so that an inline hologram lens having high accuracy can be made.

Even if the second optical element is a diffraction grating, plane wave hologram or off-axis hologram lens with a small N.A., the direction of the optical path of a plane wave beam or a plane wave approximated by a spherical wave beam can be changed. Therefore, the relative positional relation of the second optical element to the first optical element and the hologram record medium on which the inline hologram lens is recorded can be easily adjusted.

Further, if the first optical element radiates a spherical wave beam with no spherical aberration and the thickness or optical path length of the second optical element is selected substantially equal to the thickness or optical path length of the transparent body of the optical record medium through which the reproduction beam passes, a reflected wave beam with no spherical aberration can be produced even when there is a transparent body through which the reproduction beam for the record medium passes.

Having described specific preferred embodiments of the invention with reference to the accompanying drawings, it is to be understood that the invention is not limited to such precise embodiments, and that various changes and modifications may be made by one skilled in the art without departing from the scope or spirit of the invention as defined in the appended claims.

We claim as our invention:

1. A method of producing an inline hologram lens, comprising the steps of:
    producing a coherent diffracted wave beam by diffraction means;
    producing a coherent spherical wave beam by objective lens means separate from said diffraction means;
    providing said diffracted wave beam perpendicularly incident on a photo-sensitive layer as a reference wave beam;
    simultaneously providing said spherical wave beam perpendicularly incident on said photo-sensitive layer as a subject wave beam through said diffraction means; and
    developing said photo-sensitive layer to produce said inline hologram lens.

2. A method of producing an inline hologram lens according to claim 1, wherein said objective lens means includes an objective lens with a large numerical aperture.

3. A method of producing an inline hologram lens according to claim 2, wherein said step of producing a diffracted wave beam includes the steps of:
    recording on a second photo-sensitive layer a graphic interference pattern which results from simultaneous exposure of said second photo-sensitive layer to a first plane wave beam as a reference wave beam and a second plane wave beam as a subject wave beam, said beams being off-axis in respect to each other, with said subject wave beam being incident perpendicular to said second photo-sensitive layer;
    developing said second photo-sensitive layer to form off-axis hologram means;
    positioning said off-axis hologram means parallel to said first-mentioned photo-sensitive layer; and
    providing an off-axis reference wave beam incident on said off-axis hologram means.

4. A method of producing an inline hologram lens according to claim 2, wherein said step of producing a diffracted wave beam includes the steps of:
    recording on a second photo-sensitive layer a graphic interference pattern which results from simultaneous exposure of said second photo-sensitive layer to a first plane wave beam as a reference wave beam and a spherical wave beam produced by a lens with a small numerical aperature as a subject wave beam, said beams being off-axis in respect to each other with said subject wave beam being incident perpendicular to said second photo-sensitive layer;
    developing said second photo-sensitive layer to form an off-axis hologram lens;
    positioning said off-axis hologram lens parallel to said photo-sensitive layer; and
    providing an off-axis reference wave beam incident on said off-axis hologram lens.

5. A method of producing an inline hologram lens according to claim 2, wherein said diffraction means is a diffraction grating.

* * * * *